Apr. 3, 1923.

T. FERRY

FASTENING DEVICE

Filed Jan. 28, 1921

1,450,583

Inventor
Thomas Ferry
By
Chas. E. Billman
Attorney

Patented Apr. 3, 1923.

1,450,583

UNITED STATES PATENT OFFICE.

THOMAS FERRY, OF CLEVELAND, OHIO.

FASTENING DEVICE.

Application filed January 28, 1921. Serial No. 440,768.

*To all whom it may concern:*

Be it known that I, THOMAS FERRY, a citizen of the United States, residing at Cleveland, in the county of Cuyahoga and State of Ohio, have invented certain new and useful Improvements in Fastening Devices, of which the following is a specification.

My invention relates to improvements in fastening devices, and more particularly to that class or type used in assembling and fastening parts together, such as bolts and nuts and the like.

More specifically speaking, my invention relates to the terminal element or member of a bolt, such as a bolt head, nut, or the like, the invention being particularly designed and adapted for use as a substitute for the ordinary nut commonly known as a "blind nut." As the name implies, such form of nut is threaded from one side only so that the threaded portion receiving the threaded end of the bolt does not extend thru the face side of the nut, the outer side of the nut being ornamented, and where of conical shape is frequently referred to as an "acorn nut." As these nuts are generally formed of solid brass or other expensive material, and are, therefore, generally turned from bars of solid brass resulting in waste material and the nuts are thereafter bored and tapped out from one side, it is obvious that the cost of manufacture is high.

With the above mentioned and other ends in view, the invention consists in the novel construction, arrangement and combination of parts, hereinafter described, illustrated in some of its embodiments in the accompanying drawings, and particularly pointed out in the appended claim.

Figure 1:
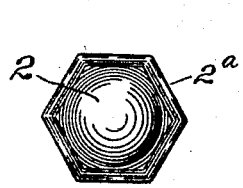

Referring to the drawings, forming a part of this specification, Figure 1 is a front elevation of the front or face side of an ordinary blind nut embodying constricted sides in accordance with my invention.

Figure 2:
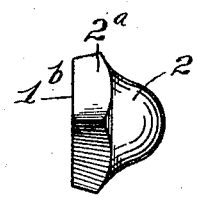

Fig. 2, a side elevation of the same.

Figure 3:
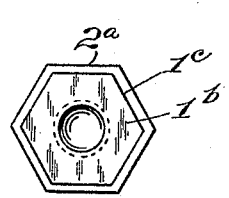

Fig. 3, a view of the under or abutting face side of the same.

Figure 4:
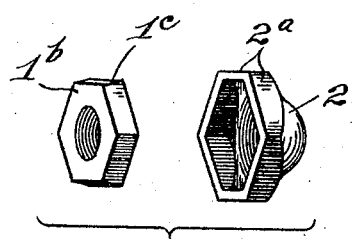

Fig. 4, a disassembled perspective view of the improved two-part or blind nut.

Figure 5:
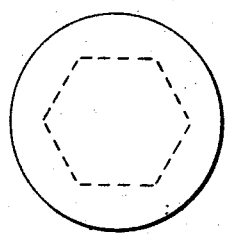

Fig. 5, a view of a blank of sheet metal before being formed into the cover cap.

Figure 6:
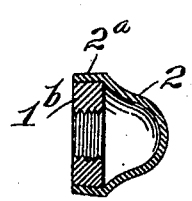

Fig. 6, a central longitudinal sectional view of the blind nut.

Figure 7:
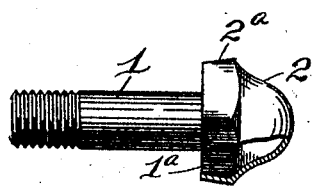

Fig. 7, a side elevation of a bolt provided with a two-part or covered head constructed in accordance with this invention.

Similar numerals of reference designate like parts thruout all the figures of the drawings.

The shank 1, of the bolt or other fastening element, may be of any suitable and convenient construction, and so likewise the head $1^a$, and nut $1^b$.

The nut $1^b$, is preferably provided with an angular shaped outer base portion or periphery $1^c$ having constricted or inwardly tapered sides, as shown, and so likewise the bolt head $1^a$, if it is desired to turn the latter and the bolt in the assembling and fastening operation.

The cap or covering preferably embodies an ornamental head portion 2, terminating in an angular base portion $2^a$, conformed to and adapted to extend over and interlock with the outer angular portion of the nut or head of the bolt, as the case may be. As applied to an ordinary nut, the head portion 2, is preferably spaced somewhat from the outer side of the nut forming a hollow head to receive the end of the threaded portion of the bolt, as shown most clearly in Fig. 6 of the drawings.

The cap or covering may be formed from a blank of sheet metal, cut or blanked from a suitable sheet, as illustrated somewhat diagrammatically in Fig. 5 of the drawings, such sheet material being of a material corresponding to that desired in the finished product.

It will be seen that the edges of the angular base portion $2^a$, of the cap extend flush with the under face or abutting side of the head $1^a$, or nut $1^b$, as the case may be, and it will be understood that the angular portion $2^a$, is placed over and firmly pressed about the angular sides of the head or nut, and as a means of causing the parts to interlock so as to reduce to a minimum any liability of the cap to be torn off, the angular portions of the head $1^a$, or nut $1^b$, are inclined or tapered inwardly forming inwardly constricted sides, as shown most clearly in Figs. 6 and 7 of the drawings, in which instance the angular base portion of the cap is likewise correspondingly tapered or constricted as shown.

The term "terminal member" as herein used and set forth in the appended claim, is understood to be used in a generic sense as including a terminal element either in the specific form of a bolt head or of a threaded nut.

Having thus described some of the embodiments of my invention, without having attempted to set forth all the forms in which it may be made, or all the modes of its use, what I claim and desire to secure by Letters Patent, is,—

A fastener including a metallic terminal member having an angular shaped base portion provided with inwardly constricted sides, and a cover cap forming a hollow terminal head provided with a similarly shaped angular base portion having similarly constricted sides fitted on and interlocking with said constricted sides of said angular base portion of said terminal member.

In testimony whereof I have affixed my signature.

THOMAS FERRY.